March 16, 1943.                G. B. HILL                2,313,872
                              FEED CUTTER
                           Filed Aug. 8, 1941
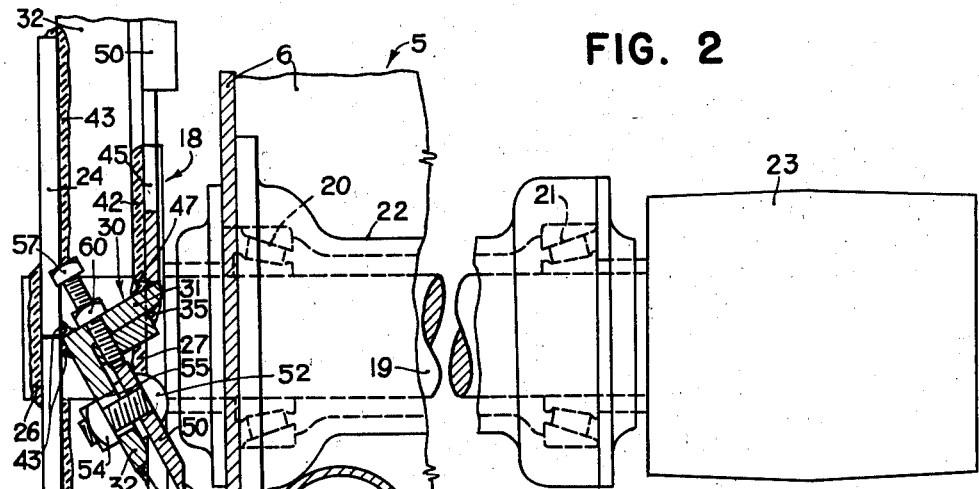
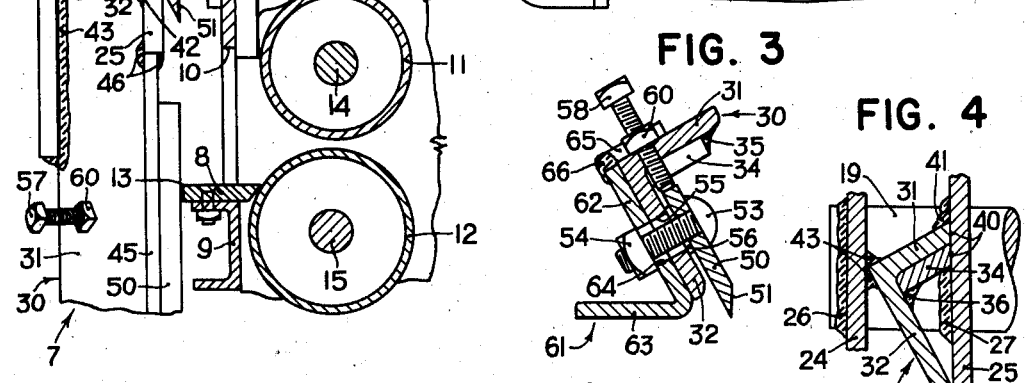
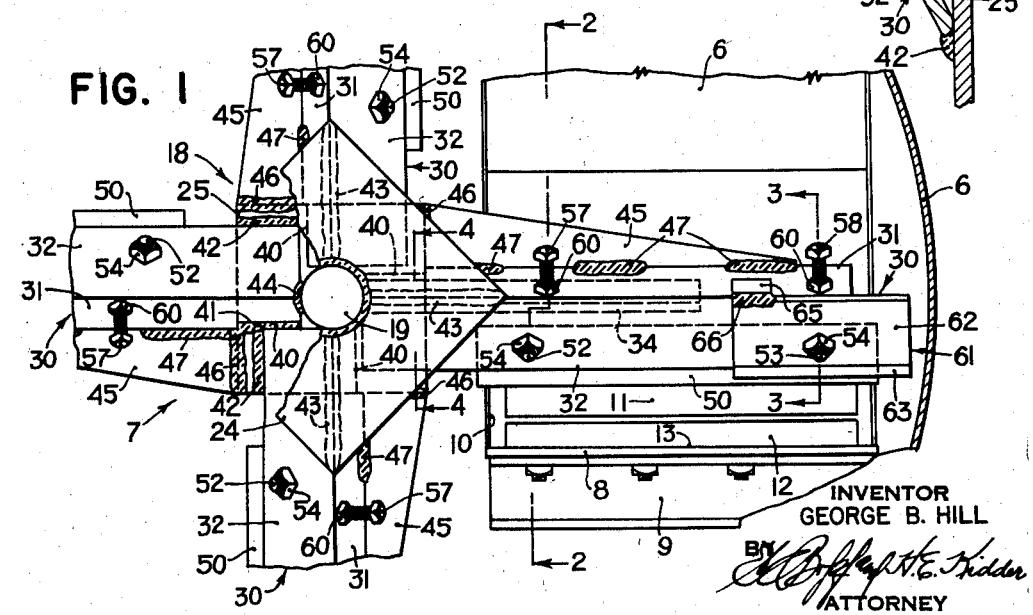
INVENTOR
GEORGE B. HILL
ATTORNEY Patented Mar. 16, 1943

2,313,872

UNITED STATES PATENT OFFICE 2,313,872

FEED CUTTER

George B. Hill, Ottumwa, Iowa, assignor to Dain Manufacturing Company of Iowa, Ottumwa, Iowa, a corporation of Iowa Application August 8, 1941, Serial No. 405,970

12 Claims. (Cl. 146—123)

The present invention relates to machines for cutting fodder or ensilage, and has for its principal object to provide an improved cutter of novel construction which can be manufactured at low cost from standard angle iron stock and which combines light weight with great strength and rigidity.

Other objects and advantageous features of my invention will become apparent to those skilled in the art after consideration of the following detailed description of the preferred embodiment thereof, reference being had to the accompanying drawing, in which:

Figure 1 is a fragmentary end elevational view of an ensilage cutter constructed according to the principles of my invention;

Fig. 2 is an enlarged sectional view taken along the line 2—2 in Figure 1;

Figure 3 is an enlarged sectional view taken along the line 3—3 in Figure 1; and Figure 4 is an enlarged sectional view taken along the line 4—4 in Figure 1.

Referring now to the drawing, the ensilage cutter is indicated in its entirety by the reference numeral 5 and consists of a housing 6 formed of heavy gauge sheet metal or boiler plate which encloses cutting mechanism 7 and provides support therefor. The cutting mechanism 7 includes a stationary knife 8 mounted on a horizontally disposed channel iron bed 9 which forms a part of the housing 6. The housing is provided with a rectangular feed opening 10 above the knife 8, and disposed immediately behind the knife 8 are a pair of vertically spaced feed rollers 11 and 12 which feed the material through the opening and over the cutting edge 13 of the knife. The feed rollers 11 and 12 are mounted on shafts 14 and 15, respectively, which are journaled in any suitable bearings on the housing 6 and are driven in the usual manner.

A rotor, indicated in its entirety by the reference numeral 18, is fixed to the inner end of a shaft 19 which is disposed within the housing 6 adjacent one end of the feed opening 10 somewhat above the stationary knife 8, and is journaled for rotation about an axis perpendicular to the cutting edge of the knife. The shaft 19 is rotatably supported by bearings 20 and 21 which are pressed into the ends of a supporting sleeve 22 fixed in any suitable manner to the housing 6. A belt pulley 23 is mounted on the outer end of the shaft 19 and affords the means for driving the latter.

The rotor 18 comprises a pair of square flat plates 24 and 25 which are apertured centrally to receive the shaft 19 and are welded thereto at 26 and 27 in axially spaced relation. The outer plate 24 is somewhat larger than the inner plate 25 and is turned with respect to the latter so that the corners thereof are at 45 degrees to the corners of plate 25. Disposed between the plates 24, 25, are four symmetrically arranged, radially extending angle iron blade-holding members 30, each having a pair of flanges 31 and 32 arranged at right angles to one another. Each of the angle irons 30 is turned so that both flanges 31, 32 are angled with respect to the plane of rotation.

Additional stiffness and rigidity for the angle iron member 30 is provided by a stiffening member in the form of a bar 34 which is disposed to lie on the inside of the angle iron against the flange 31 and parallel thereto. The bar 34 extends outwardly from the shaft end of the angle iron for about two thirds of the length thereof and is welded along its edges to the angle iron 30 at 35 and 36. The portion of flange 31 and bar 34 overlying the back plate 25 is milled away to provide an angularly disposed face 40 which is adapted to lie flat against the plate 25 when the edge of flange 32 contacts the plate. In the preferred construction, the face 40 is disposed at an angle of 28 degrees with respect to the flange 32 as this has been found to be the most satisfactory angle, but it will be understood that any other angle might be used with a certain degree of success. Flanges 31 and 32 are welded at 41 and 42, respectively, to the plate 25, while the apex or corner of the angle iron is welded at 43 to the outer plate 24. The end of the angle iron abutting the shaft 19 is welded thereto at 44.

Each of the angle iron members 30 is further braced against whipping by a triangular bracing member 45, one edge of which is welded at 46 to the edge of the inner plate 25 and another edge of which is welded at 47 to the trailing edge of flange 31.

Mounted on the inside of the leading flange 32 of each of the angle irons 30 is a blade 50 which is bevelled at 51 to form a cutting edge that registers with the cutting edge 13 of the stationary knife 8 to shear the material as it is fed over the latter. Preferably, the bevel 51 is ground so as to lie in the plane of rotation of the rotor, thereby providing a self-sharpening action which keeps the cutting edges sharp. The blade 50 is attached to the flange 32 by means of two round-headed bolts 52 and 53 which pass through aligned apertures in the blade and flange and are secured by nuts 54. The bolt holes 55 in the angle iron flange 32 are preferably slots to allow the bolts to move with the blade 50 when the latter is adjusted toward or away from the stationary knife 8. Washers or shims 56 are inserted between the blade 50 and the flange 32 for the purpose of providing a two point bearing contact therebetween which eliminates the necessity for machining the surface of the flange to secure a plane bed for the blade.

The blade 50 is adjusted relative to the angle iron 30 by means of two adjusting screws 57 and 58 which are screwed through threaded apertures in the flange 31 and bear against the back of the blade. When the screws 57, 58 are screwed in, the blade 50 is pushed away from the flange 31 toward the cutting edge of the stationary knife 8, and when the screws are backed out, the blade 50 can be pushed back toward the flange 31. Lock nuts 60 on the screws 57, 58 lock the screws in adjusted position.

Material that has been cut by the above-described cutting mechanism is propelled through the usual discharge duct (not shown) by means of paddles 61 which are fixed to the outer ends of the angle irons 30. These paddles are preferably formed of short lengths of angle iron stock, the flanges of which are disposed at an acute angle to one another. One flange 62 of the paddle is disposed to lie flat against the outside of flange 32, while the other flange 63 of the paddle lies in a plane perpendicular to the plane of rotation. The paddle 61 is secured to the angle iron 30 by the outer blade-fastening bolt 53 which passes through a slot 64 in the paddle flange 62. The slot 64 is parallel to slot 55 to permit movement of the bolt 53 when the blade is adjusted. A short length of strap 65 is welded at 66 to the inner end of the paddle flange 62 and overlies the top of flange 31 to prevent the paddle from turning about the bolt 53 as a pivot.

The paddles 61 pick up the cut material and hurl it through the tangentially extending discharge duct at high velocity. At the same time, the paddles act as fan blades, generating a blast of air to assist in carrying the material out of the housing.

A cutter constructed in the manner described above has great strength and rigidity, and at the same time can be produced at low cost because it is made up of standard rolled stock. Being welded, there are no rivets or bolts to come loose, and no special machine tools or patterns other than a simple welding jig are required.

What I claim as my invention is:

1. In an ensilage cutter having a housing, a stationary knife fixed to the housing, and a rotor journaled within said housing for rotation about an axis perpendicular to the cutting edge of said knife, an angle iron fixed to and forming a part of said rotor, said angle iron extending radially outwardly from the axis of rotation of the rotor with the flanges thereof angled with respect to the plane of rotation, a blade mounted on the inside of one of the flanges of said angle iron and movable relative thereto toward and away from said stationary knife, and means cooperating with the other flange of said angle iron for adjusting the position of said blade relative to said stationary knife.

2. In an ensilage cutter having a housing, a stationary knife fixed to the housing, and a rotor journaled within said housing for rotation about an axis perpendicular to the cutting edge of said knife, an angle iron fixed to and forming a part of said rotor, said angle iron extending radially outwardly from the axis of rotation of the rotor with the flanges thereof angled with respect to the plane of rotation, a blade adapted to lie against the inside face of one of the flanges of said angle iron and movable relative thereto, means for clamping the blade to said one flange, and a screw member threaded into the other flange of said angle iron and bearing against the back of the blade for adjusting the same toward or away from the stationary knife.

3. In an ensilage cutter having a stationary knife and a shaft journaled for rotation about an axis perpendicular to the cutting edge of said knife, a radially extending blade holding member fixed to said shaft, said member being disposed at an angle to the plane of rotation, a blade adapted to lie against one side of said member, a paddle, and common securing means for clamping both said blade and said paddle to said holding member.

4. In an ensilage cutter having a stationary knife and a shaft journaled for rotation about an axis perpendicular to the cutting edge of said knife, a radially extending blade holding member fixed to said shaft, said member being disposed at an angle to the plane of rotation, a blade adapted to lie against one side of said member, a paddle adapted to lie against the opposite side of said holding member, and a common securing member extending through aligned apertures in the holding member, blade, and paddle for clamping the same together.

5. In an ensilage cutter having a stationary knife and a shaft journaled for rotation about an axis perpendicular to the cutting edge of said knife, a pair of axially spaced hub plates fixed to said shaft, a radially extending angle iron having one end disposed between and rigidly fixed to said plates, said angle iron being positioned with one flange ahead of the other and both flanges angled with respect to the plane of rotation, a bracing member fixed to the trailing edge of the rear flange and to one of said hub plates, and a blade mounted on the front flange with the cutting edge thereof disposed to register with the cutting edge of said stationary knife.

6. A rotary cutter comprising a plurality of radially extending blade holding members fixed to a common support, each of said members comprising an angle iron having one flange thereof disposed at an acute angle to the plane of rotation, a blade disposed flat against one side of said flange and having a beveled cutting edge shiftable axially by shifting the blade along the plane of said flange, and adjustable securing means for rigidly attaching said blade to said flange in different positions of adjustment.

7. A rotary cutter comprising a pair of plates fixed to a common shaft in axially spaced relation thereon, a radially extending angle iron having one end thereof disposed between and fixed to said plates, the sides of said angle iron being inclined with respect to the plane of rotation, a blade disposed flat against one of the sides of said angle iron and having a beveled cutting edge shiftable axially by shifting the blade along the plane of said one side of the angle iron, and adjustable securing means for rigidly attaching said blade to the side of said angle iron in different positions of adjustment.

8. A rotary cutter comprising an angle iron having one end thereof fixed to a rotatable support, one flange of said angle iron being inclined with respect to the plane of rotation, a blade disposed on one side of said one flange, a paddle having a portion thereof disposed on the other side of said one flange, and a common securing member joining said blade, and said paddle to said one flange of the angle iron.

9. A rotary cutter comprising a pair of axially spaced plates fixed to a shaft, an angle iron having one end thereof disposed between said plates, said angle iron being turned so that the flanges thereof are angled with respect to the plane of rotation, the edges of both flanges being welded to one plate and the corner of the angle iron being welded to the other plate, and a blade fixed to one flange of the angle iron.

10. A feed cutter comprising an angle iron fixed at one end thereof to a rotary support, said angle iron being turned so that the flanges thereof are angled with respect to the plane of rotation, a blade disposed flat against one flange of said angle iron, and releasably secured thereto, a bracing member welded to the inside surface of the other flange thereof, said bracing member and other flange having aligned threaded apertures, and a set screw extending through said apertures into engagement with the back of said blade.

11. A feed cutter comprising a shaft, a pair of axially spaced plates fixed thereto parallel to the plane of rotation, an angle iron having one end thereof disposed between said plates, said angle iron being turned so that the flanges thereof are angled with respect to the plane of rotation, a blade fixed to one of the flanges of said angle iron, and a bracing member fixed to the other flange and overlapping one of said plates, the overlapping portion of said other flange and said bracing member being recessed so that the blade is positioned at the desired angle with respect to the plane of rotation when both flanges are in contact with said one plate, the flanges of said angle iron being welded along their edges to said one plate and the corner thereof being welded to the other plate.

12. A feed cutter comprising an angle iron fixed to a rotary support, said angle iron being turned so that the flanges thereof are inclined with respect to the plane of rotation, a blade adjustably mounted on one of the flanges of said angle iron, and an adjusting screw cooperating with the other flange of the angle iron and with said blade for adjusting the position of the latter with respect to the angle iron.

GEORGE B. HILL.